US008171363B2

(12) United States Patent
Soejima et al.

(10) Patent No.: US 8,171,363 B2
(45) Date of Patent: May 1, 2012

(54) METHOD AND DEVICE FOR COUNTING TRANSMISSION TIMES OF DATA UNIT, TRANSMISSION DEVICE, AND COMPUTER PROGRAM

(75) Inventors: Yoshinori Soejima, Fukuoka (JP); Kazuhisa Obuchi, Kawasaki (JP); Hirotoshi Shimizu, Kawasaki (JP); Akihide Otonari, Fukuoka (JP); Shinya Okamoto, Fukuoka (JP); Miki Yamasaki, Fukuoka (JP); Chiaki Shinohara, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 973 days.

(21) Appl. No.: 12/216,234

(22) Filed: Jul. 1, 2008

(65) Prior Publication Data

US 2009/0044068 A1    Feb. 12, 2009

(30) Foreign Application Priority Data

Aug. 10, 2007 (JP) ................................. 2007-210515

(51) Int. Cl.
*G06F 11/00* (2006.01)
(52) U.S. Cl. ........................................ 714/748; 714/750
(58) Field of Classification Search .................. 714/50, 714/51, 748, 750, 798; 370/230, 235
See application file for complete search history.

(56) References Cited

U.S. PATENT DOCUMENTS

| 4,829,524 | A  | * | 5/1989  | Yoshida ........................ 714/748 |
| 6,333,932 | B1 |   | 12/2001 | Kobayasi et al. |
| 6,449,631 | B1 | * | 9/2002  | Takamoto et al. ............ 709/200 |
| 6,473,399 | B1 |   | 10/2002 | Johansson et al. |
| 6,532,211 | B1 |   | 3/2003  | Rathonyi et al. |
| 6,556,556 | B1 | * | 4/2003  | Sen et al. ........................ 370/342 |
| 6,865,240 | B1 | * | 3/2005  | Kawataka ....................... 375/368 |
| 7,159,162 | B2 |   | 1/2007  | Ludwig et al. |
| 2001/0027486 | A1 | * | 10/2001 | Takamoto et al. ............ 709/227 |
| 2003/0079169 | A1 |   | 4/2003  | Ho |
| 2006/0045032 | A1 |   | 3/2006  | Hamada |

(Continued)

FOREIGN PATENT DOCUMENTS

JP        8-214002         8/1996

(Continued)

OTHER PUBLICATIONS

Extended European Search Report dated Feb. 10, 2010 received in the corresponding European Patent Application No. 08159528.2-1237/2023522.

(Continued)

*Primary Examiner* — Joshua Lohn
(74) *Attorney, Agent, or Firm* — Murphy & King, P.C.

(57) ABSTRACT

A method for counting correctly substantial transmission times of a data unit such as an RLC-PDU even if the data unit is divided before being transmitted is provided. The method includes the steps of preparing a counter for the RLC-PDU (#503), making a storage portion store a pointer indicating a position of a division PDU of the RLC-PDU to be transmitted every time when the division PDU obtained by dividing the RLC-PDU is transmitted (#504), determining whether or not the transmission times should be counted along with a transmission of the division PDU to be transmitted based on the pointer of the division PDU to be transmitted and the pointer of a division PDU that was transmitted last time (#505, #506 and #507), and making the counter perform the count process when it is determined that the transmission times should be counted (#508).

8 Claims, 10 Drawing Sheets

U.S. PATENT DOCUMENTS

2006/0050679 A1   3/2006  Jiang
2006/0259844 A1 * 11/2006  Kawada ........................ 714/748

FOREIGN PATENT DOCUMENTS

| JP | 2001-320417 | 11/2001 |
|---|---|---|
| JP | 2002-271442 | 9/2002 |
| JP | 2002-528959 | 9/2002 |
| JP | 2002-532000 | 9/2002 |
| JP | 2004-289574 | 10/2004 |
| JP | 3634465 | 1/2005 |
| JP | 2005-518142 | 6/2005 |
| JP | 2006-67099 | 3/2006 |
| JP | 2006-87097 | 3/2006 |
| JP | 2007-509530 | 4/2007 |
| JP | 2007-509532 | 4/2007 |
| WO | WO2005039127 | 4/2005 |
| WO | WO2005039133 | 4/2005 |
| WO | 2007050231 | 5/2007 |

OTHER PUBLICATIONS

3GPP TS 36.300 V8.1.0. (Jun. 2007).

* cited by examiner

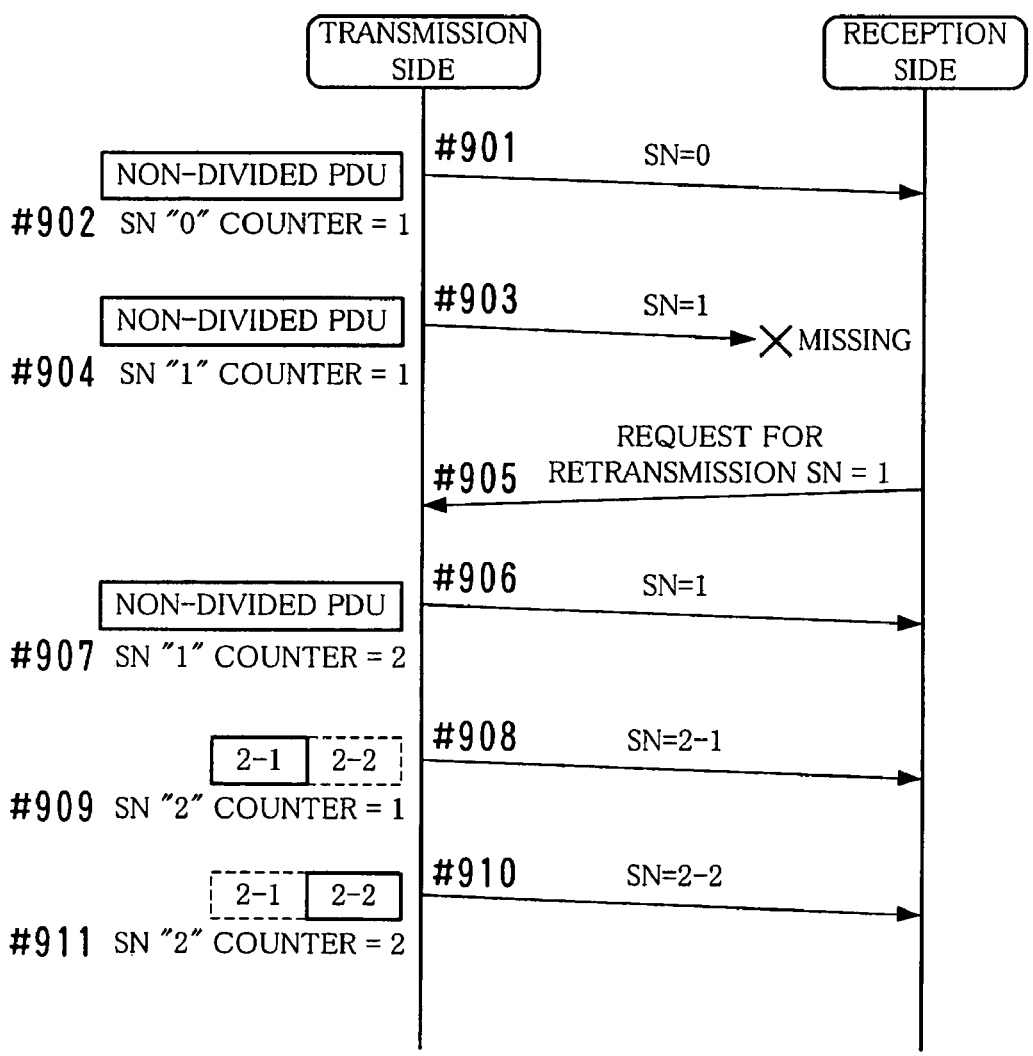

METHOD AND DEVICE FOR COUNTING TRANSMISSION TIMES OF DATA UNIT, TRANSMISSION DEVICE, AND COMPUTER PROGRAM

BACKGROUND OF THE INVENTION

1. Field of the Invention

The present invention relates to a method, a device and the like for counting transmission times of data units having the same variable length.

2. Description of the Related Art

FIG. 9 is a diagram for explaining an example of a process in an RLC sub layer and FIG. 10 is a diagram for explaining a conventional problem with a counter for counting transmission times.

In a radio communication system, user data is transmitted and received between two devices based on a radio communication protocol.

A layer 2 of a protocol for a cellular phone network includes sub layers such as a MAC (Medium Access Control) sub layer, an RLC (Radio Link Control) sub layer and a PDCP (Packet Data Convergence Protocol) sub layer and the like from the lowest.

There are a plurality of PDCP entities and RLC entities corresponding to the number of logical channels (LCH) used by two devices that perform interactive communication.

As shown in FIG. 9, in a device on the transmission side an RLC entity of a certain logical channel divides user data into a plurality of RLC-SDU's (Service Data Units) and generates an RLC-PDU (Protocol Data Unit) by adding a header to each of the RLC-SDU's or by other operation. The header includes protocol control information such as a sequence number.

Furthermore, these RLC-PDU's are processed by the MAC sub layer and the layer 1, and they are sent to the RLC entity of the same logical channel in a device on the reception side.

The RLC-PDU's are sent out from the RLC entity of the device on the transmission side sequentially in the order of the sequence number. Therefore, it is expected that the RLC-PDU's are received sequentially in the order of the sequence number by the RLC entity of the device on the reception side.

If the RLC-PDU that is expected to be received next is not received in the case where a confirmation mode is used, the RLC entity of the device on the reception side regularly requests the RLC entity of the device on the transmission side to retransmit it until it is received. The RLC entity of the device on the transmission side retransmits the RLC-PDU based on the request. In this way, transmission confirmation is performed between both the RLC entities based on the sequence number conventionally.

In addition, as described in "3GPP TS 36.300 V8.1.0 (2007-06)", published by 3GPP (The 3rd Generation Partnership Project), URL "http://www.3gpp.org/ftp/Specs/archive/36_series/36.300/363 00-810.zip", searched on the Internet on Aug. 7, 2007, the planning of a new communication standard is carried on. According to this communication standard, the RLC-PDU can have a variable length. Therefore, it becomes possible to divide the RLC-PDU before transmitting and receiving it.

The RLC entity of the device on the transmission side counts the number of times of sending out the RLC-PDU for each RLC-PDU (i.e., for each sequence number). However, if the RLC-PDU is divided into N before sending it out according to the conventional counting method, the number of times of sending out the RLC-PDU becomes N.

More specifically, if the RLC-PDU having the sequence number "0" is transmitted without being divided as shown in FIG. 10 for example (#901), transmission times of the RLC-PDU become "1" (#902). If the RLC-PDU having the sequence number "1" is transmitted without being divided (#903), transmission times of the RLC-PDU become "1" (#904). When the request for retransmission of the RLC-PDU is accepted (#905), the RLC-PDU is retransmitted (#906), and transmission times of the RLC-PDU are increased (incremented) by "1" to be "2" (#907).

If the RLC-PDU having the sequence number "2" is divided into two division units and if a first division unit is transmitted (#908), transmission times of the RLC-PDU become "1" (#909). However, if the other division unit is transmitted (#910), the transmission times of the RLC-PDU are increased by "1" though it is not a retransmission (#911).

In this way, when a data unit such as the RLC-PDU is divided before being transmitted according to the conventional counting method, it is difficult to count correctly substantial transmission times of the data unit.

SUMMARY OF THE INVENTION

It is an object of the present invention to make it possible to count correctly substantial transmission times of a data unit such as the RLC-PDU even if the data unit is divided before being transmitted.

A counting method according to an aspect of the present invention is a method for counting transmission times of a data unit with a transmission device that can transmit the data unit to a reception device as it is or part by part after dividing the data unit into parts, and can retransmit the transmitted data unit to the reception device. The method includes preparing a counter that counts the transmission times, making a storage portion store position information indicating a position of the data unit to be transmitted every time when the transmission device transmits the data unit to the reception device, determining whether or not the transmission times should be counted along with a transmission of the data unit based on the position information of the data unit to be transmitted and position information of a data unit that was transmitted last time, and making the counter count the transmission times when it is determined by the determining that the transmission times should be counted.

Preferably, the method may further include counting update times of updating information about the transmission times if it is necessary to add information about the transmission times when a request for retransmission of the data unit is issued by the reception device.

Further, the determining may include determining that the transmission times should be counted when a leading position of the data unit to be transmitted indicated in the position information of the data unit to be transmitted is prior to an ending position of the data unit that was transmitted last time indicated in the position information of the data unit that was transmitted last time, or the leading position and the ending position are the same.

Further, it may be determined by the determining that the transmission times should be counted regardless of contents of the position information of the data unit to be transmitted or contents of the position information of the data unit that was transmitted last time if the data unit to be transmitted is an entirety of the data unit that was transmitted last time.

The structure described above makes it possible to count correctly substantial transmission times of a data unit such as the RLC-PDU even if the data unit is divided before being transmitted.

BRIEF DESCRIPTION OF THE DRAWINGS

FIG. 10 is a diagram for explaining a conventional problem with a counter for counting transmission times.

DESCRIPTION OF THE PREFERRED EMBODIMENTS

The invention will now be described in detail with reference to the attached drawings.

Figure 1:
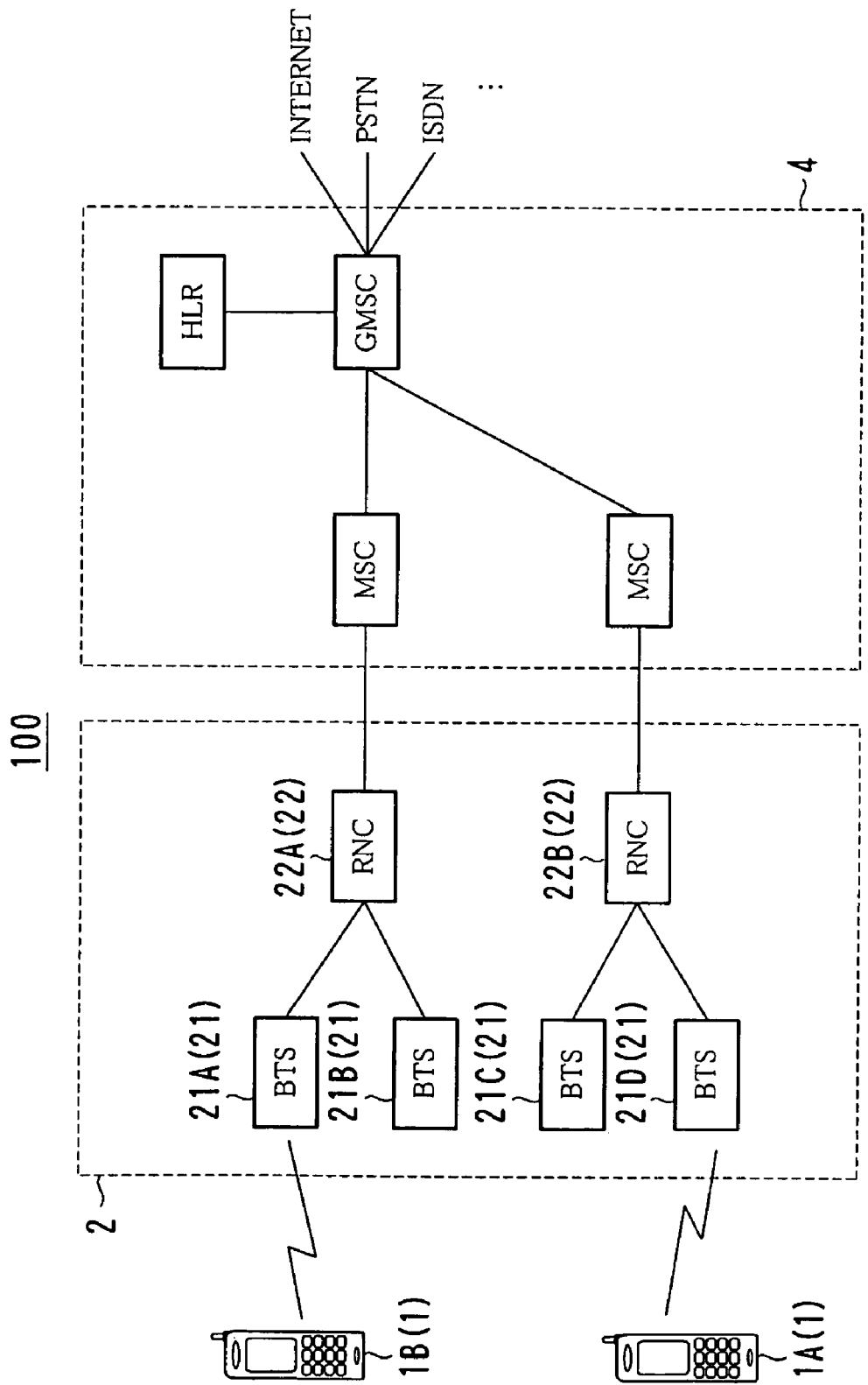
FIG. 1 is a diagram showing an example of an overall structure of a communication system.
Figure 2:
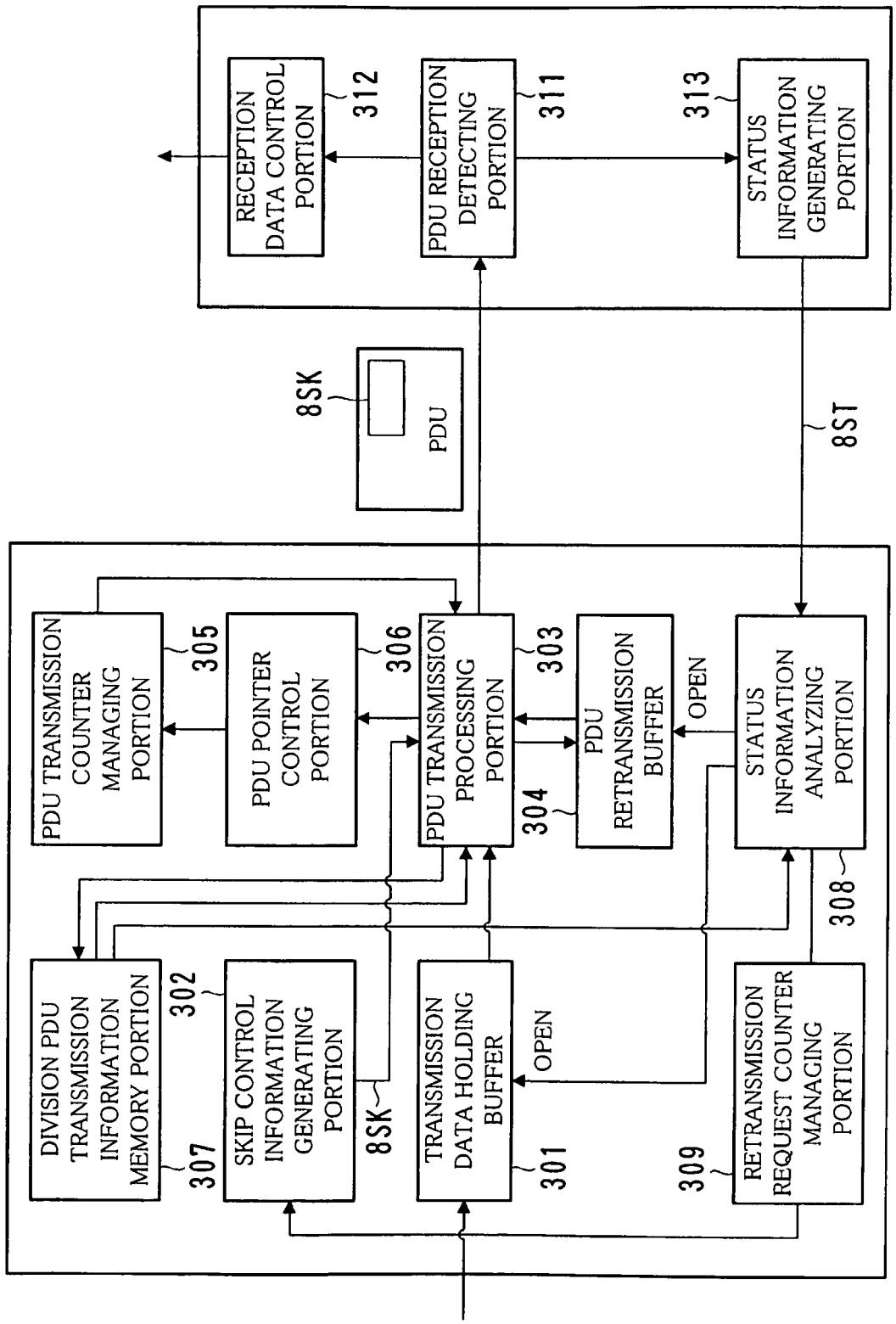
FIG. 2 is a diagram showing an example of a functional structure of a mobile phone terminal and a base station or a network controller that performs a process of the layer 2.

FIG. 1 is a diagram showing an example of an overall structure of a communication system 100, and FIG. 2 is a diagram showing an example of a functional structure of a mobile phone terminal 1 and a base station 21 or a network controller 22 that performs a process of the layer 2.

The communication system 100 is a system for providing a radio communication service by a cellular phone network to users, and it includes mobile phone terminals 1, a radio communication network 2 and a core network 4 as shown in FIG. 1.

The radio communication network 2 includes base transceiver stations (BTS's) 21 and radio network controllers (RNC's) 22, and performs a process for controlling connection of the mobile phone terminal 1, a process for relaying communication between the mobile phone terminal 1 and the core network 4, and the like.

The core network 4 includes mobile service switching centers (MSC's), a gateway MSC (GMSC) and a home location register (HLR).

The mobile phone terminal 1 is a terminal device for mobile phone communication that is used by a user. The mobile phone terminal 1 can perform communication with another mobile phone terminal 1, a PHS terminal, a so-called fixed telephone terminal and the like via the radio communication network 2, the core network 4 and the like. In addition, the mobile phone terminal 1 can perform communication with a web server, an electronic mail server or the like on the Internet.

A protocol that is used in the radio communication performed between the mobile phone terminal 1 and the radio communication network 2 is one obtained by applying the method of the present invention to the conventional radio communication protocol. Hereinafter, the radio communication performed between the mobile phone terminal 1 and the radio communication network 2 based on this protocol will be described in detail.

Each device of the radio communication network 2 has means for a transmission process of data in the RLC sub layer in this protocol. Specifically, each device includes a transmission data holding buffer 301, a skip control information generating portion 302, a PDU transmission processing portion 303, a PDU retransmission buffer 304, a PDU transmission counter managing portion 305, a PDU pointer control portion 306, a division PDU transmission information memory portion 307, a status information analyzing portion 308 and a retransmission request counter managing portion 309 as shown in FIG. 2.

These means may be included in the base station 21 or in the network controller 22. Which device includes them is different generally depending on the generation. For example, the network controller includes them in 3G while the base station includes them in super 3G. Hereinafter, the case where the base station 21 includes the means shown in FIG. 2 will be described as an example.

In addition, it has means for a reception process of data in the RLC sub layer. Specifically, it includes a PDU reception detecting portion 311, a reception data control portion 312 and a status information generating portion 313.

The mobile phone terminal 1 also has the individual means shown in FIG. 2.

The individual portions shown in FIG. 2 can be realized by a CPU controlling hardware based on software or by a special-purpose circuit.

Figure 3:
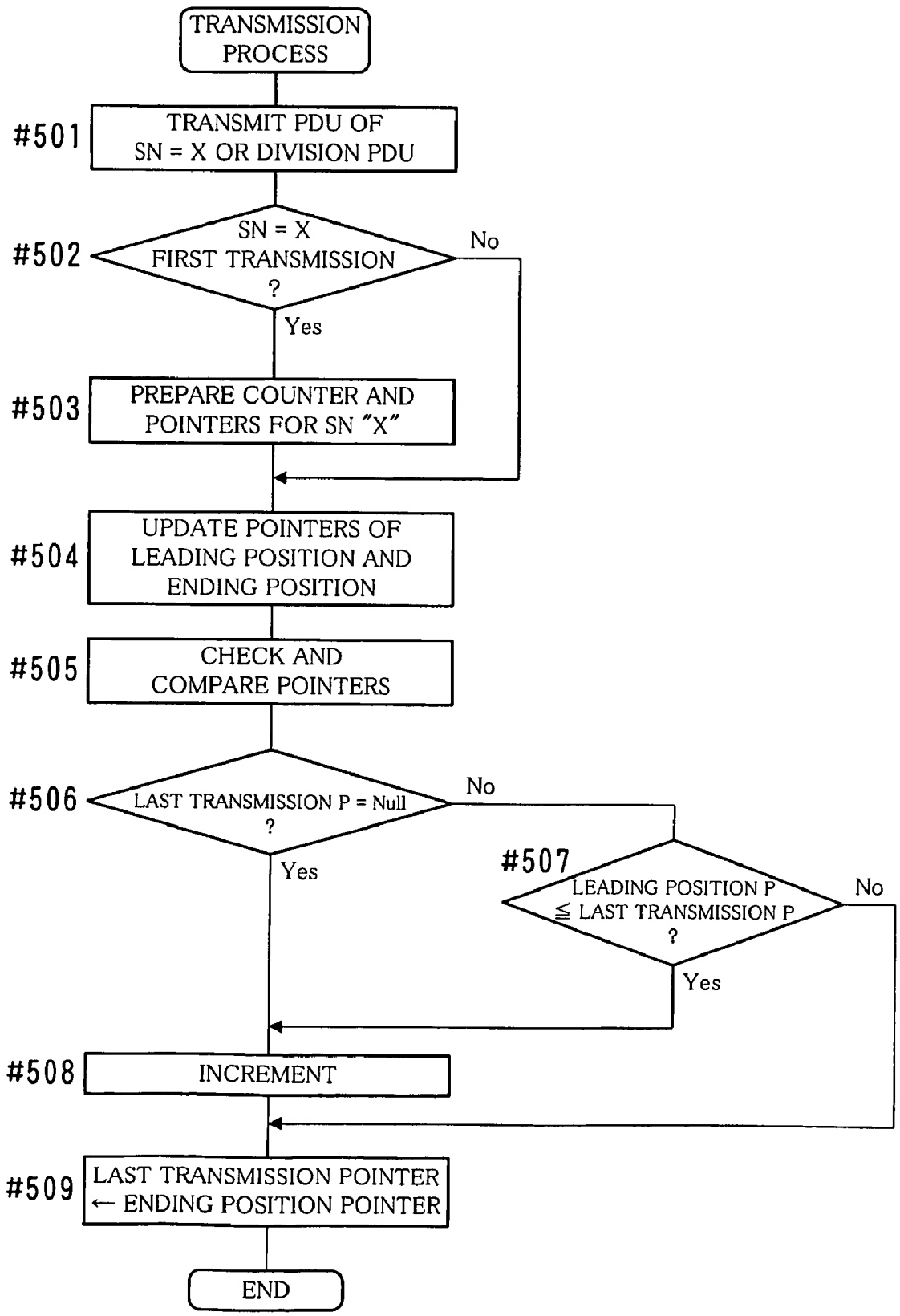
FIG. 3 is a flowchart for explaining an example of a flow of a transmission process.
Figure 4:
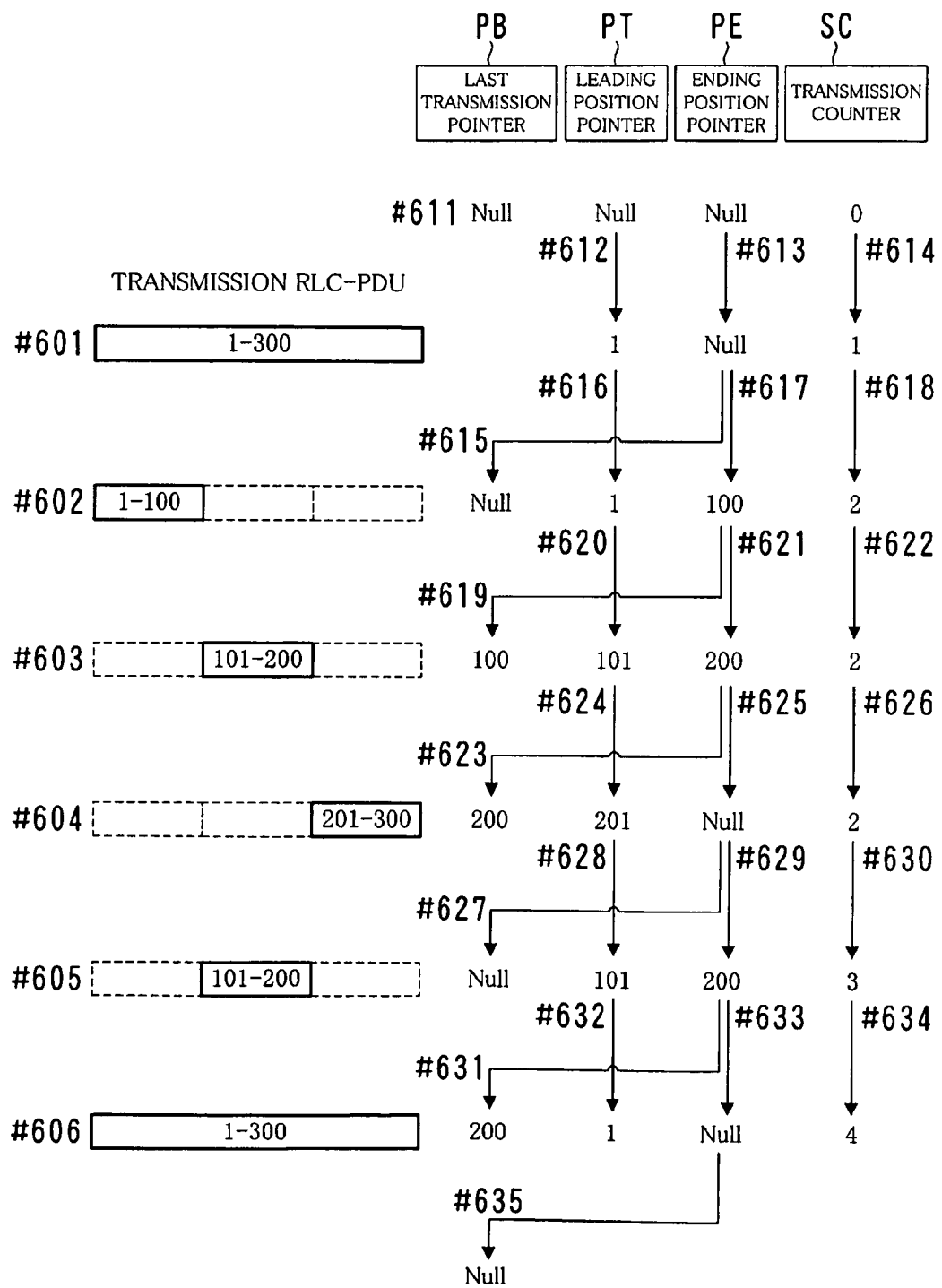
FIG. 4 is a diagram for explaining an example of changes of a last transmission pointer, a leading position pointer, an ending position pointer and a transmission counter.

FIG. 3 is a flowchart for explaining an example of a flow of a transmission process, and FIG. 4 is a diagram for explaining an example of changes of a last transmission pointer PB, a leading position pointer PT, an ending position pointer PE and a transmission counter SC.

Next, process contents of the individual portions shown in FIG. 2 will be described with reference to flowchart and the like in which a case is exemplified where a base station 21A relays data (hereinafter referred to as "user data") received from the core network 4 of a certain logical channel to a mobile phone terminal 1B.

In the base station 21A, the transmission data holding buffer 301 shown in FIG. 2 holds (stores) temporarily the user data that is to be transmitted to the mobile phone terminal 1B and is transmitted from the upper layer one after another.

The skip control information generating portion 302 generates skip control information 8SK that is described in the RLC-PDU as appropriate that is to be transmitted to the mobile phone terminal 1B. This skip control information 8SK is information for instructions to skip (abort or stop) acquisition of the RLC-PDU of a particular sequence number. Timing for generating the skip control information 8SK and handling of the same in the mobile phone terminal 1B will be described later.

The PDU transmission processing portion 303 divides the user data stored in the transmission data holding buffer 301 into data (RLC-SDU) having a length within a predetermined range and adds a header including the sequence number to the RLC-SDU so as to generate the RLC-PDU. Then, a process for transmitting this RLC-PDU to the RLC entity of the same logical channel in the mobile phone terminal 1B is performed. As described later, the skip control information 8SK generated by the skip control information generating portion 302 may be described in the header.

In the case of retransmission, the RLC-PDU stored in the PDU retransmission buffer 304 is transmitted, that will be described later.

The PDU transmission processing portion 303 divides the generated RLC-PDU into a plurality of units (hereinafter referred to as "division PDU's"), and performs the transmission process for each of the division PDU's.

A length of the RLC-SDU, whether or not the RLC-PDU should be divided, and a length of the division PDU are determined in accordance with a situation of the communication line, frequency of occurrence of retransmission in the logical channel, a balance between QoS (Quality of Service) of the logical channel and QoS of other logical channels, or the like.

If the RLC-PDU is divided before being transmitted, the division PDU transmission information memory portion 307 stores information indicating which part of the RLC-PDU corresponds to each of the division PDU's. More specifically, it stores a pointer indicating a leading position of each of the division PDU's (how many bytes from the leading position in the RLC-PDU) and a pointer indicating an end position of each of the division PDU's. These pointers are used for various processes that will be described later.

These pointers of the division PDU that is estimated to be received by the mobile phone terminal 1B are removed from the division PDU transmission information memory portion 307.

The PDU retransmission buffer 304 holds (stores) temporarily the RLC-PDU for which the transmission process was performed by the PDU transmission processing portion 303 for the case where a request for retransmission is issued later.

The RLC-PDU or the division PDU that is estimated to be received by the mobile phone terminal 1B is removed from the PDU retransmission buffer 304.

The PDU transmission counter managing portion 305 manages a counter (hereinafter referred to as a "transmission counter SC") for counting transmission times for each RLC-PDU for which the transmission process is performed by the PDU transmission processing portion 303.

The PDU pointer control portion 306 controls three pointers so as to determine whether the transmission counter SC for the RLC-PDU should be increased by "1" or not.

Here, the counting method of transmission times of the RLC-PDU performed by the PDU transmission counter managing portion 305 and the PDU pointer control portion 306 will be described with reference to the flowchart shown in FIG. 3.

When the PDU transmission processing portion 303 performs the transmission process of the RLC-PDU (#501 in FIG. 3), if the RLC-PDU is transmitted for the first time and if no division PDU's of the RLC-PDU have ever been transmitted (Yes in #502), the PDU pointer control portion 306 prepares a transmission counter SC for the RLC-PDU by generating the same or by other operation while the PDU transmission counter managing portion 305 prepares a last transmission pointer PB, a leading position pointer PT and an ending position pointer PE for the RLC-PDU by generating the same for each or by other operation (#503). An initial value of the transmission counter SC is "0". Each of the initial values of the last transmission pointer PB, the leading position pointer PT and the ending position pointer PE is "Null".

If the transmission process of the division PDU of the RLC-PDU is performed by the PDU transmission processing portion 303, and if the RLC-PDU in a non-divided state has never been transmitted and if no division PDU's of the RLC-PDU have ever been transmitted, a transmission counter SC, a last transmission pointer PB, a leading position pointer PT and an ending position pointer PE for the RLC-PDU are generated.

The leading position pointer PT and the ending position pointer PE of the RLC-PDU are updated as follows (#504).

If the division PDU of the RLC-PDU is transmitted, the leading position pointer PT and the ending position pointer PE are updated so that it is indicated which part of the RLC-PDU corresponds to the division PDU. In other words, it is checked how many bytes from the leading position in the RLC-PDU corresponds to the leading position of the division PDU so as to update the leading position pointer PT to indicate a result of the checking. In addition, it is checked how many bytes from the leading position in the RLC-PDU corresponds to the ending position of the division PDU so as to update the ending position pointer PE to indicate a result of the checking. However, the last byte in the RLC-PDU is designated by "Null" in the present embodiment since there is no data after it. Instead of "Null", other values such as "EOD (End of Data)" can be used, for example. Otherwise, the last byte itself may be used.

Also in the case where the RLC-PDU is transmitted without being divided, the leading position pointer PT and the ending position pointer PE are updated in the same manner as the case of the division PDU. In this case, however, the leading position pointer PT is determined to be "1" while the ending position pointer PE is determined to be "Null" naturally regardless of the data length of the RLC-PDU.

In this way, the range of the RLC-PDU or the division PDU that is transmitted this time is indicated by the leading position pointer PT and the ending position pointer PE.

If the RLC-PDU or the division PDU has been transmitted before, the last transmission pointer PB indicates the ending position (bytes of the ending position from the leading point) of the RLC-PDU or the division PDU that was transmitted last time. If none of the RLC-PDU and the division PDU has been transmitted yet, the initial value of "Null" is indicated for convenience as described above.

With reference to the flowchart again, the PDU pointer control portion 306 checks whether or not the current value of the last transmission pointer PB is "Null" or compares the current value of the last transmission pointer PB with a value of the leading position pointer PT (#505).

If the current value of the last transmission pointer PB is "Null" (Yes in #506), the PDU transmission counter managing portion 305 increases the transmission counter SC by "1" (#509). Also in the case where the value of the leading position pointer PT is smaller than or equal to the value of the last transmission pointer PB (Yes in #507), the transmission counter SC is increased by "1" (#510).

If the current value of the last transmission pointer PB is not "Null" and if the value of the leading position pointer PT is larger than the value of the last transmission pointer PB (No in #506 and No in #507), the transmission counter SC is not increased.

Then, the last transmission pointer PB is updated to indicate the current value of the ending position pointer PE (#509).

Here, contents of the process shown in FIG. 3 will be described in more detail with reference to an example of the case where transmission and retransmission of a certain RLC-PDU consisting of data having 300 bytes are performed in the order shown in FIG. 4.

In the example of FIG. 4, the RLC-PDU is transmitted without being divided first (#601). Then, the RLC-PDU is divided into three division PDU's, which are transmitted one by one (#602, #603 and #604). Then, the second division PDU is transmitted again (#605), and the RLC-PDU is transmitted again without being divided (#606).

When the RLC-PDU is transmitted for the first time (#601 in FIG. 4, #501 in FIG. 3 and Yes in #502), the PDU transmission counter managing portion 305 and the PDU pointer control portion 306 prepare the transmission counter SC having the initial value "0", the last transmission pointer PB, the leading position pointer PT and the transmission counter SC each of which has the initial value "Null" (#611 and #503).

The PDU pointer control portion 306 updates the leading position pointer PT to indicate "1" and updates the ending position pointer PE to indicate "Null" in accordance with the transmission of this time (#612, #613 and #504).

The PDU pointer control portion 306 performs checking or comparing of the pointer (#505). Currently, the last transmission pointer PB indicates "Null". Therefore (Yes in #506), the PDU transmission counter managing portion 305 increases the transmission counter SC for the RLC-PDU by "1" (#614 and #508).

Then, the PDU transmission counter managing portion 305 updates the last transmission pointer PB to indicate the current value of the ending position pointer PE, i.e., "Null" (#615 and #509).

Next, the RLC-PDU is divided into three division PDU's. When a first division PDU is transmitted (#602, #501 and No in #502), the PDU pointer control portion 306 updates the leading position pointer PT to indicate "1" and updates the ending position pointer PE to indicate "100" in accordance with the transmission of this time (#616, #617 and #504).

The PDU pointer control portion 306 performs checking or comparing of the pointer (#505). Currently, the last transmission pointer PB indicates "Null". Therefore (Yes in #506), the PDU transmission counter managing portion 305 increases the transmission counter SC for the RLC-PDU by "1" this time, too (#618 and #508).

Then, the PDU transmission counter managing portion 305 updates the last transmission pointer PB to indicate the current value of the ending position pointer PE, i.e., "100" (#619 and #509).

When a second division PDU is transmitted (#603, #501 and No in #502), the PDU pointer control portion 306 updates the leading position pointer PT to indicate "101" and updates the ending position pointer PE to indicate "200" in accordance with the transmission of this time (#620, #621 and #504).

The PDU pointer control portion 306 performs checking or comparing of the pointer (#505). Currently, the last transmission pointer PB indicates "100" while the leading position pointer PT indicates "101". Since the value of the leading position pointer PT is larger than the value of the last transmission pointer PB (No in #506 and No in #507), the increment is not performed (#622).

Then, the PDU transmission counter managing portion 305 updates the last transmission pointer PB to indicate the current value of the ending position pointer PE, i.e., "200" (#623 and #509).

When a third division PDU is transmitted (#604, #501 and No in #502), the PDU pointer control portion 306 updates the leading position pointer PT to indicate "201" and updates the ending position pointer PE to indicate "Null" in accordance with the transmission of this time (#624, #625 and #504).

The PDU pointer control portion 306 performs checking or comparing of the pointer (#505). Currently, the last transmission pointer PB indicates "200" while the leading position pointer PT indicates "201". Since the value of the leading position pointer PT is larger than the value of the last transmission pointer PB (No in #506 and No in #507), the increment is not performed this time, either (#626).

Then, the PDU transmission counter managing portion 305 updates the last transmission pointer PB to indicate the current value of the ending position pointer PE, i.e., "Null" (#627 and #509).

When the second division PDU is transmitted again (#605, #501 and No in #502), in accordance with the transmission of this time, the PDU pointer control portion 306 updates the leading position pointer PT to indicate "101" and updates the ending position pointer PE to indicate "200" (#628, #629 and #504).

The PDU pointer control portion 306 performs checking or comparing of the pointer (#505). Since the last transmission pointer PB indicates "Null" at the present (Yes in #506), the transmission counter SC is increased by "1" (#630).

Then, the PDU transmission counter managing portion 305 updates the last transmission pointer PB to indicate the current value of the ending position pointer PE, i.e., "200" (#631 and #509).

When the RLC-PDU is transmitted again without being divided (#606, #501 and No in #502), the PDU pointer control portion 306 updates the leading position pointer PT to indicate "1" and updates the ending position pointer PE to indicate "Null" in accordance with the transmission of this time (#632, #633 and #504).

The PDU pointer control portion 306 performs checking or comparing of the pointer (#505). Currently, the last transmission pointer PB indicates "200" while the leading position pointer PT indicates "1". In other words, since the value of the last transmission pointer PB is smaller than or equal to the value of the leading position pointer PT (Yes in #507), the transmission counter SC is increased by "1" (#634).

Then, the PDU transmission counter managing portion 305 updates the last transmission pointer PB to indicate the current value of the ending position pointer PE, i.e., "Null" (#635, #509).

According to the method described above with reference to FIGS. 3 and 4, the substantial transmission times of the data unit can be counted correctly even if the data unit such as the RLC-PDU is divided before it is transmitted.

Figure 5:
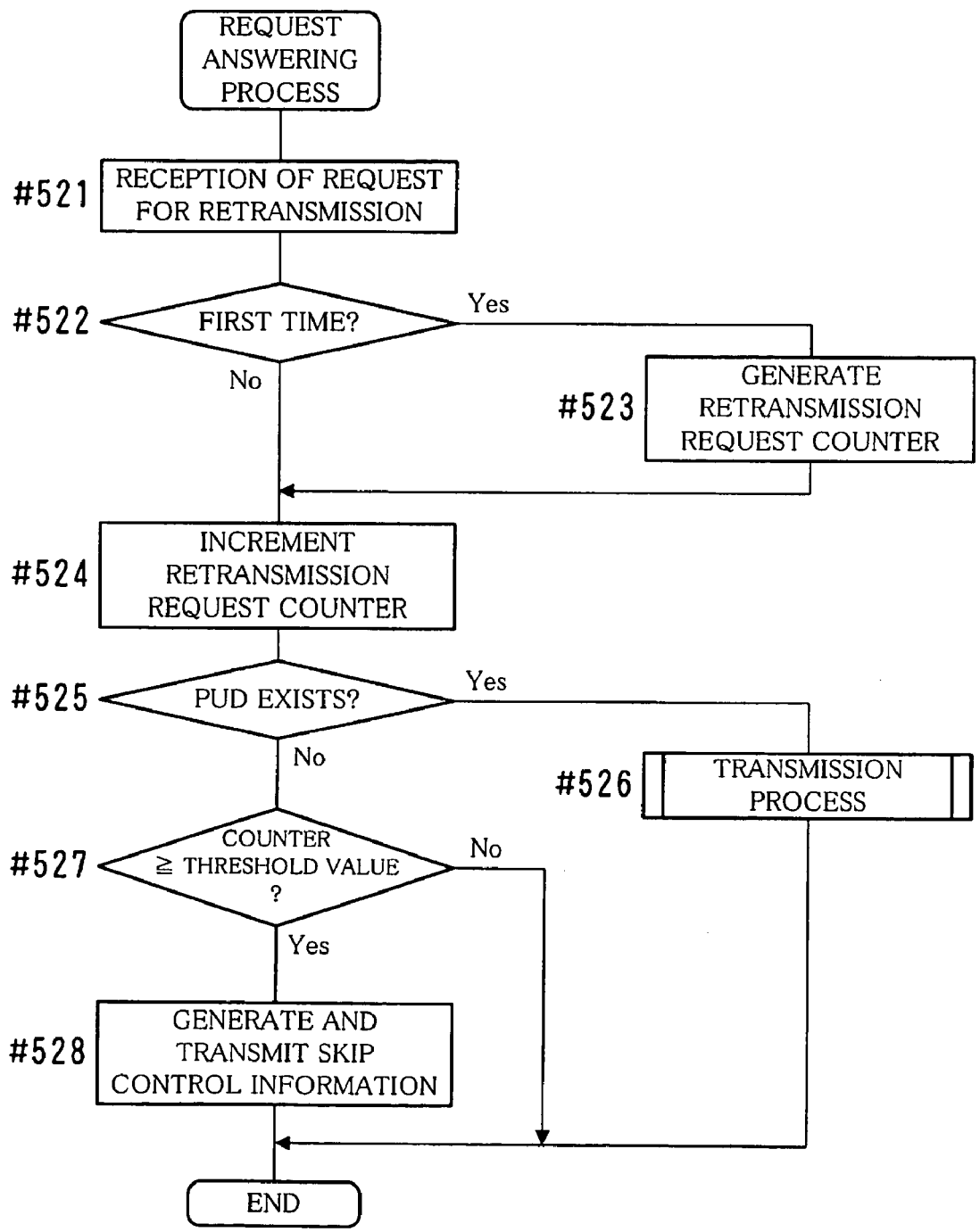
FIG. 5 is a flowchart for explaining an example of a flow of a request answering process.
Figure 6:
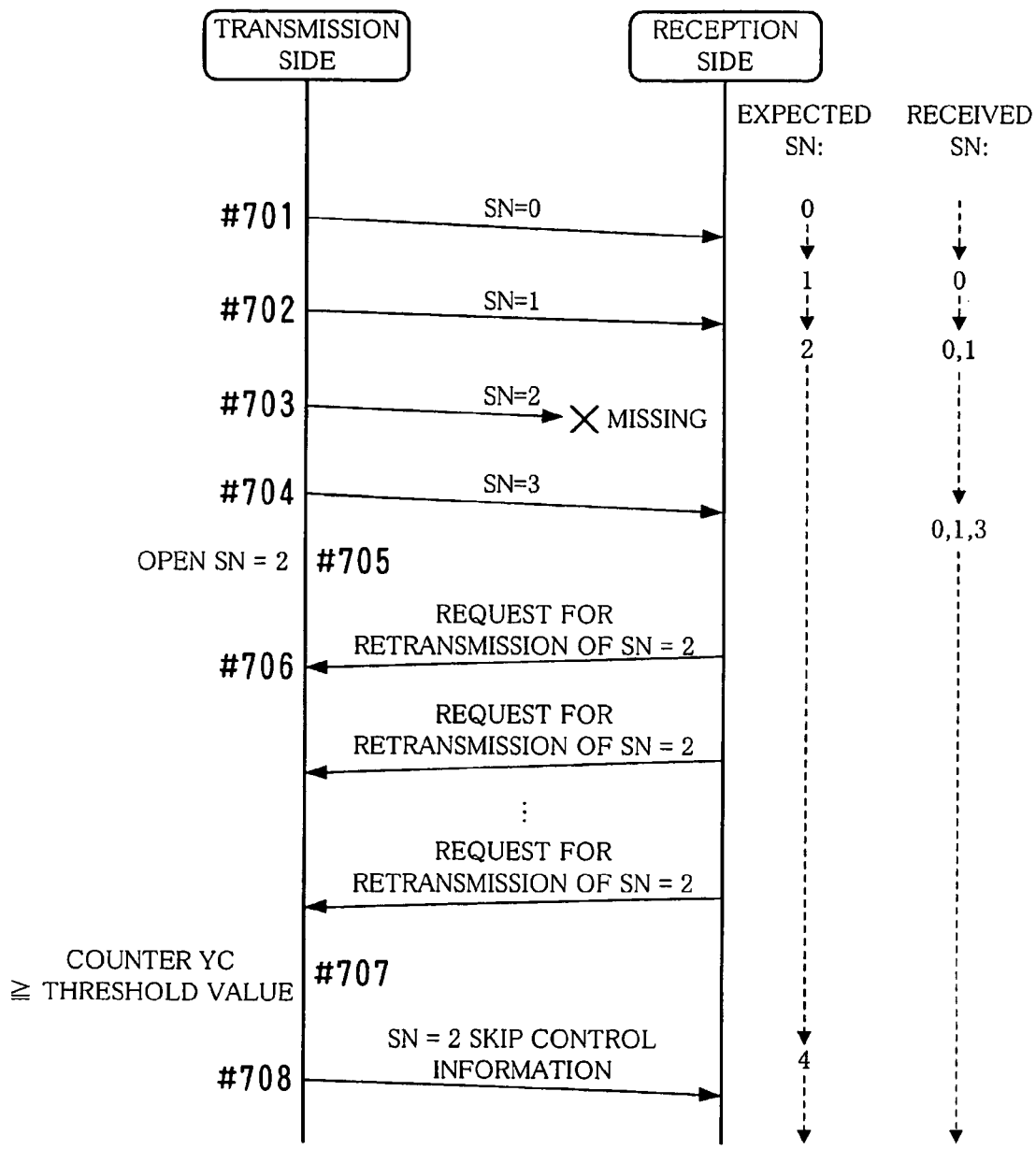
FIG. 6 is a diagram for explaining an example of processes for handling a request for retransmission on the transmission side and on the reception side.
Figure 7:
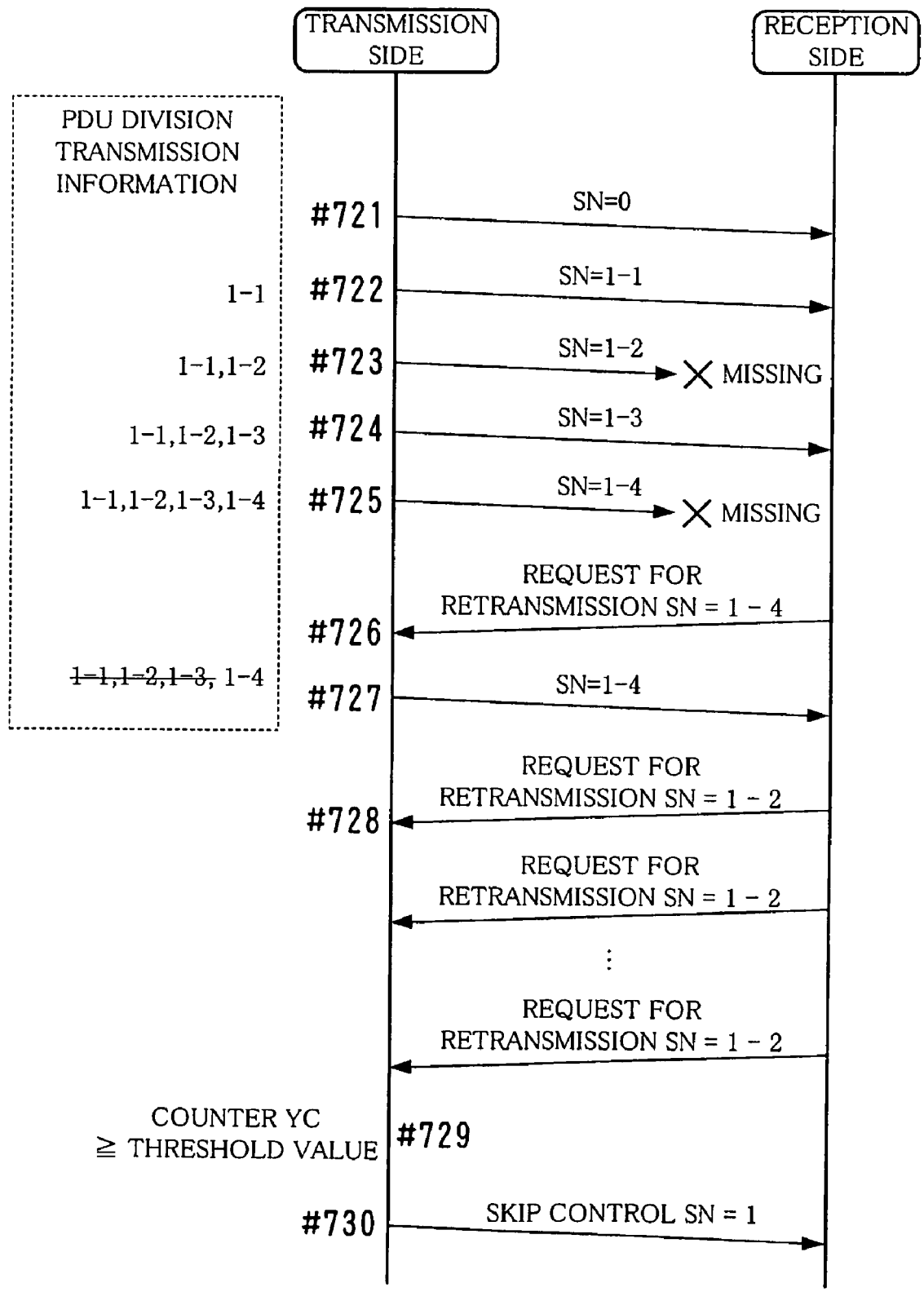
FIG. 7 is a diagram for explaining an example of processes for handling a request for retransmission on the transmission side and on the reception side.

FIG. 5 is a flowchart for explaining an example of a flow of a request answering process, FIGS. 6 and 7 are diagrams for explaining an example of a process of handling the request for retransmission on the transmission side and on the reception side.

With reference to FIG. 2 again, the PDU reception detecting portion 311 of the mobile phone terminal 1B confirms a reception state of the RLC-PDU based on the sequence number of the RLC-PDU that was transmitted sequentially from the base station 21A. In other words, it is confirmed which RLC-PDU could be received normally up to now or which RLC-PDU that should have been received is not received yet. In addition, the RLC-PDU that is expected to be received next is determined. In other words, the smallest sequence number is searched from among sequence numbers of the RLC-PDU's that are not received yet. Then, the RLC-PDU of the searched sequence number is determined to be the expected RLC-PDU.

The reception data control portion 312 sends the received RLC-PDU to the upper sub layer, i.e., the PDCP sub layer.

The status information generating portion 313 generates status information 8ST indicating a reception state about by which sequence number of RLC-PDU has been received or which sequence number of RLC-PDU has not been received yet, or the like. This status information 8ST is transmitted to the base station 21A.

The status information 8ST indicating the RLC-PDU that has not been received yet is also used for requesting the base station 21A to send the RLC-PDU. In other words, the status information 8ST indicating the RLC-PDU that has not been received yet is also information for request for retransmission. If the retransmission of the division PDU is requested, the status information 8ST indicating a sequence number of the original RLC-PDU and the number of the division PDU (i.e., what number is the division PDU) is transmitted.

However, if the skip control information 8SK is received, the mobile phone terminal 1B skips receiving process of the RLC-PDU of the sequence number indicated in the skip control information 8SK. In other words, the receiving process of the RLC-PDU is stopped. In connection with it, the status information generating portion 313 stops requesting the RLC-PDU.

The status information analyzing portion 308 of the base station 21A analyzes the status information 8ST received from the mobile phone terminal 1B and controls the individual portions as follows.

If it could be analyzed by which sequence number of RLC-PDU has been received by the mobile phone terminal 1B, the PDU retransmission buffer 304 is controlled so that backup data of the RLC-PDU before the sequence number is deleted.

On the other hand, if it could be analyzed which RLC-PDU or division PDU is not received yet by the mobile phone terminal 1B, i.e., if the request for retransmission of the RLC-PDU or the division PDU could be analyzed, the retransmission request counter managing portion 309 is controlled so as to perform a process of counting retransmission times, and the PDU transmission processing portion 303 is controlled so that a process of retransmitting the RLC-PDU or the division PDU is performed.

The retransmission request counter managing portion 309 manages a counter (hereinafter referred to as a "retransmission request counter YC") for counting the number of times of the request for retransmission for each RLC-PDU based on a result of the analysis performed by the status information analyzing portion 308.

Here, the counting method with the retransmission request counter YC and a control method of the retransmission will be described with reference to the flowchart shown in FIG. 5.

When the status information analyzing portion 308 analyzes that the request for retransmission of the RLC-PDU or the division PDU is received (#521 in FIG. 5), the retransmission request counter managing portion 309 prepares the retransmission request counter YC for the RLC-PDU or the division PDU by generating it or by other operation if the request for retransmission of the RLC-PDU or the division PDU is made for the first time (Yes in #522). An initial value of the retransmission request counter YC is "0".

Furthermore, the RLC-PDU and all the division PDU's obtained by dividing the RLC-PDU may share the same retransmission request counter YC, or it is possible to prepare the retransmission request counters YC, one for each of the RLC-PDU and the individual division PDU's. Hereinafter, the former case will be described as an example. Therefore, the retransmission request counter YC that is common to the RLC-PDU and the individual division PDU's is prepared if there is no request for retransmission of the RLC-PDU and no request for retransmission of each of the division PDU's up to now.

The retransmission request counter YC of the RLC-PDU or the division PDU related to the request for retransmission is increased by "1" (#524).

If the RLC-PDU or the division PDU is stored in the PDU retransmission buffer 304 (Yes in #525), an instruction to retransmit the same is issued to the PDU transmission processing portion 303. As a result, the RLC-PDU or the division PDU is retransmitted to the mobile phone terminal 1B (#526). A flow of the retransmission process is as described above with reference to FIG. 3.

Furthermore, if the request for retransmission is related to the division PDU and if the PDU retransmission buffer 304 stores the non-divided RLC-PDU, the PDU transmission processing portion 303 can extract the division PDU from the RLC-PDU based on the pointer indicating the leading position and the pointer indicating the ending position of the division PDU stored in the division PDU transmission information memory portion 307.

If the RLC-PDU or the division PDU is not stored in the PDU retransmission buffer 304 (No in #525) and if a value of the retransmission request counter YC is higher than or equal to the threshold value α (Yes in #527), the skip control information generating portion 302 is made to perform a process of generating the skip control information 8SK indicating the sequence number of the RLC-PDU or the division PDU. This skip control information 8SK is sent to the mobile phone terminal 1B by adding it to a header of another RLC-PDU that is transmitted to the mobile phone terminal 1B next or by other operation (#528).

Furthermore, although the checking process of a value of the retransmission request counter YC and the transmission process of the necessary skip control information 8SK in the steps #527 and #528 are performed after checking whether or not there is the requested RLC-PDU or division PDU in the example shown in FIG. 5, it is possible to perform the processes in the steps #527 and #528 first.

Next, a concrete example of the case where the request for retransmission of a non-divided RLC-PDU is performed and a concrete example of the case where the request for retransmission of a division PDU is performed will be described with reference to FIGS. 6 and 7.

The base station 21A transmits four RLC-PDU's having the sequence numbers "0" to "3" respectively to the mobile phone terminal 1B one by one (#701 to #704 in FIG. 6). If the RLC-PDU having the sequence number "2" is missing without being received by the mobile phone terminal 1B, the mobile phone terminal 1B issues a request for retransmission of the RLC-PDU.

When the base station 21A receives the request (#706), it retransmits the RLC-PDU.

However, if the RLC-PDU has been opened or deleted from the PDU retransmission buffer 304 before the request is received, it cannot be retransmitted. Therefore, the retransmission request counter YC for the RLC-PDU is prepared, so that the number of reception times of the request for retransmission of the RLC-PDU is counted.

The mobile phone terminal 1B issues the request for retransmission as appropriate as long as the RLC-PDU cannot be received. In addition, it expects that the RLC-PDU will be transmitted next during the period.

When the number of reception times of the request for retransmission of the RLC-PDU reaches a predetermined number of times or larger (#707), the base station 21A transmits the skip control information 8SK indicating the sequence number of the RLC-PDU, i.e., "2" to the mobile phone terminal 1B (#708).

When the mobile phone terminal 1B receives this skip control information 8SK, it skips reception of the RLC-PDU of the sequence number "2" indicated in the skip control information 8SK.

As shown in FIG. 7, the base station 21A divides the RLC-PDU having the sequence number "1" into four division PDU's and transmits the same to the mobile phone terminal 1B (#722 to #725 in FIG. 6). If the second division PDU and the fourth division PDU are missing without being received by the mobile phone terminal 1B, the mobile phone terminal 1B issues a request for retransmission of each of the division PDU's. The base station 21A performs retransmission based on each of the requests.

The base station 21A may receive the request for retransmission of the fourth division PDU prior to the request for retransmission of the second division PDU (#726 and #728).

However, based on the reception of the retransmission of the fourth division PDU, the base station 21A may decide that the first to third division PDU's are received normally prior to the fourth division PDU by the mobile phone terminal 1B. In this case, data for retransmitting the second division PDU (the original RLC-PDU or the division PDU itself) may be deleted from the PDU retransmission buffer 304 before receiving the request for retransmission of the second division PDU. In addition, the individual pointers indicating the leading position and the ending position of the second division PDU may also be deleted from the division PDU transmission information memory portion 307. In this case, the second division PDU cannot be retransmitted.

Therefore, the retransmission request counter YC for the original RLC-PDU of the division PDU is prepared, so that the number of reception times of the request for retransmission is counted.

The mobile phone terminal 1B issues the request for retransmission as appropriate as long as the division PDU cannot be received.

When a value of the retransmission request counter YC reaches a predetermined number of times or larger (#729), the base station 21A transmits the skip control information 8SK indicating the sequence number of the RLC-PDU related to the retransmission request counter YC, i.e., "1" to the mobile phone terminal 1B (#730).

When the mobile phone terminal 1B receives this skip control information 8SK, it skips reception of the RLC-PDU of the sequence number "1" indicated in the skip control information 8SK.

According to the method described above with reference to FIGS. 5 to 7, an endless loop of the request for retransmission can be prevented.

Figure 8:
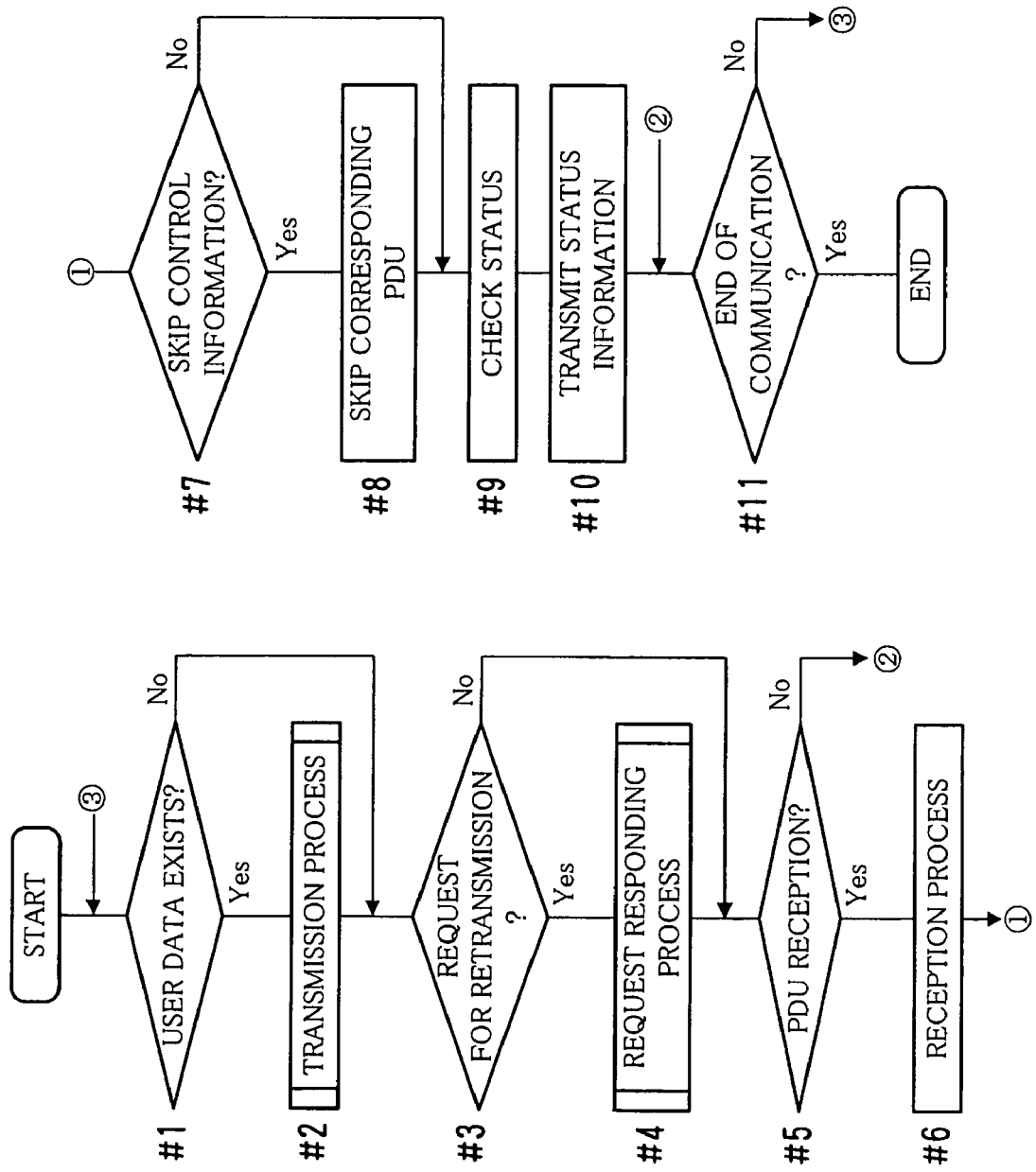
FIG. 8 is a flowchart for explaining an example of a flow of a general process of the device that performs radio communication to which the method according to the present invention is applied.
Figure 9:
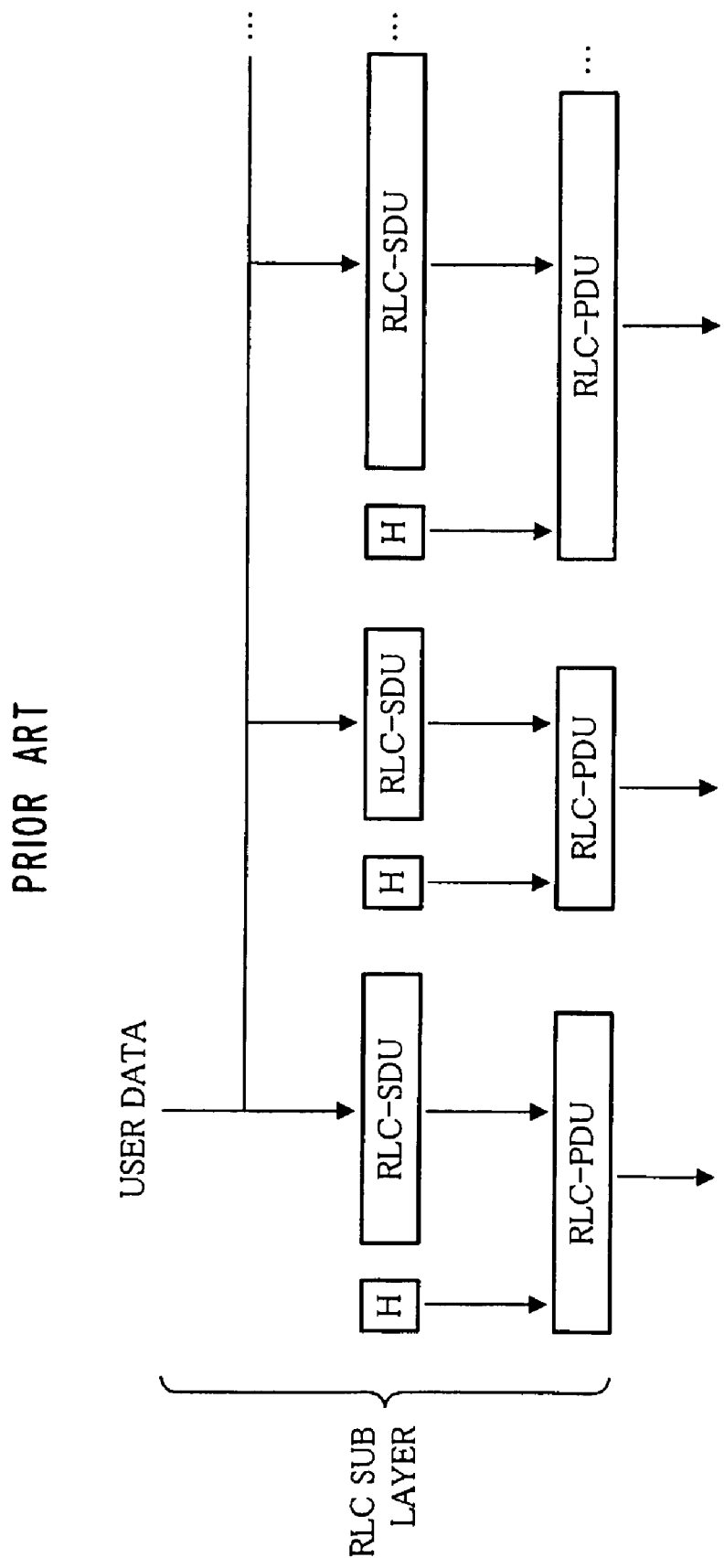
FIG. 9 is a diagram for explaining an example of a process in the RLC sub layer.

FIG. 8 is a flowchart for explaining an example of a flow of a general process of the device that performs radio communication to which the method according to the present invention is applied.

Next, a flow of a general process of the device that performs radio communication to which the method according to the present invention is applied will be described with an example of a flow of a process of the base station 21A that performs bidirectional communication with the mobile phone terminal 1B with reference to the flowchart shown in FIG. 8.

If the base station 21A has user data to be transmitted to the mobile phone terminal 1B (Yes in #1 of FIG. 8), the base station 21A performs a process of transmitting the same to the mobile phone terminal 1B by adding it to the RLC-PDU or by other operation (#2). On this occasion, the transmission times are counted for each RLC-PDU. Details of the procedures of the transmission and count processes are as described above with reference to FIG. 3.

When the request for retransmission of the RLC-PDU or the division PDU is issued by the mobile phone terminal 1B (Yes in #3), a process of retransmitting the same is performed (#4). Details of the procedure of this process are as described above with reference to FIG. 5.

The process of the steps #1 to #4 is a process of communication in the downlink direction. The process of the step #5 and the subsequent steps is a process of communication in the uplink direction.

When the RLC-PDU or the division PDU is received from the mobile phone terminal 1B (Yes in #5), a process of receiving and passing the same to the upper layer and other processes are performed (#6). If the RLC-PDU or the division PDU includes the skip control information 8SK (Yes in #7), the reception process of the RLC-PDU of the sequence number indicated in the skip control information 8SK is stopped (#8). In other words, the RLC-PDU of the sequence number is skipped.

A state of the RLC-PDU received from the mobile phone terminal 1B is checked (#9), and status information 8ST indicating the state is transmitted to the mobile phone terminal 1B (#10). The status information 8ST may be information of the request for retransmission.

The base station 21A performs the process described above as appropriate during the period until the communication with the mobile phone terminal 1B is completed.

According to the present embodiment, the substantial transmission times of the data unit can be counted correctly even if the data unit such as the RLC-PDU is divided before it is transmitted. In addition, an endless loop of the request for retransmission can be prevented. In this way, an abnormal state in transmission and reception of the data unit can be detected and handled appropriately according to the present embodiment.

The threshold value $\alpha$ can be set arbitrarily by an administrator or the like. Otherwise, it is possible to adopt another structure in which the threshold value $\alpha$ can be changed appropriately in accordance with a situation of the communication line, QoS or the like.

Although the case where the network controller 22 transmits data to the mobile phone terminal 1 is exemplified in the present embodiment, the present invention can be applied to a case of the opposite direction. In addition, the present invention can also be applied to a case of communication between other devices. The present invention can also be applied to a case of a data unit other than the RLC-PDU.

It is possible to redivide the RLC-PDU when the request for retransmission is issued. Then, one or more division PDU's including a part related to the request may be transmitted.

Although it is determined whether or not to make the retransmission request counter YC perform the count process by performing checking or comparing of the pointer in the case where the RLC-PDU is transmitted or retransmitted in the same manner as in the case where the division PDU is transmitted or retransmitted in the present embodiment as described above with reference to FIGS. 3 and 4, it is possible to adopt another structure in which the retransmission request counter YC is made to perform the count process unconditionally if the RLC-PDU is transmitted or retransmitted.

The last transmission pointer PB, the leading position pointer PT and the ending position pointer PE that have become unnecessary should be deleted as appropriate. Otherwise, they may be reused for the RLC-PDU that will be generated later.

If the RLC-PDU is divided into a plurality of division PDU's before it is transmitted and if there is a request for retransmission of a division PDU related to a region outside the transmission range (e.g., the division PDU that has never been transmitted yet or the division PDU that is already opened (deleted) from the PDU retransmission buffer 304), the retransmission request counter YC may be made to perform the count process in spite of the method described above with reference to FIGS. 3 and 4.

When a request for transmission of information about the transmission times is issued together with the request for retransmission of the RLC-PDU or the division PDU, it is possible to transmit information about the transmission counter SC for the RLC-PDU or the division PDU and various related information to the sender of the request. In addition, it is possible to count also the number of times of request for transmission by the counter and to update the number of times thereof every time when the request for transmission is issued.

Although the communication system 100 using the cellular phone network is exemplified in the description of the present embodiment, the present invention can be applied also to a case of the communication system that uses another network such as a PHS or a wireless LAN.

Other than that, the structure, the process contents, the process order and the like of the entire or the individual portions of the communication system 100, the mobile phone terminal 1, the radio communication network 2 and the network controller 22 can be modified as appropriate in accordance with the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for counting transmission times of a data unit with a transmission device that can transmit the data unit to a reception device as it is or part by part after dividing the data unit into parts, and can retransmit the transmitted data unit to the reception device, the method comprising:
   preparing a counter that counts the transmission times;
   making a storage portion store position information indicating a position of the data unit to be transmitted every time when the transmission device transmits the data unit to the reception device;
   determining whether or not the transmission times should be counted along with a transmission of the data unit based on the position information of the data unit to be transmitted and position information of a data unit that was transmitted last time; and
   making the counter count the transmission times when it is determined by the determining that the transmission times should be counted.

2. The method for counting transmission times of a data unit according to claim 1, further comprising counting update times of updating information about the transmission times if it is necessary to add information about the transmission times when a request for retransmission of the data unit is issued by the reception device.

3. The method for counting transmission times of a data unit according to claim 1, wherein the determining includes determining that the transmission times should be counted when a leading position of the data unit to be transmitted indicated in the position information of the data unit to be transmitted is prior to an ending position of the data unit that was transmitted last time indicated in the position information of the data unit that was transmitted last time, or the leading position and the ending position are the same.

4. The method for counting transmission times of a data unit according to claim 1, wherein it is determined by the determining that the transmission times should be counted regardless of contents of the position information of the data unit to be transmitted or contents of the position information of the data unit that was transmitted last time if the data unit to be transmitted is an entirety of the data unit that was transmitted last time.

5. The method for counting transmission times of a data unit according to claim 1, wherein the data unit is a Protocol Data Unit of a Radio Link Control sub layer.

6. A count device for counting transmission times of a data unit with a transmission device that can transmit the data unit to a reception device as it is or part by part after dividing the data unit into parts, and can retransmit the transmitted data unit to the reception device, the count device comprising:
   a storage portion that stores position information indicating a position of the data unit to be transmitted every time when the transmission device transmits the data unit to the reception device;
   a determining portion that determines whether or not the transmission times should be counted along with a transmission of the data unit based on the position information of the data unit to be transmitted and position information of a data unit that was transmitted last time; and
   a counting portion that counts the transmission times when it is determined by the determining portion that the transmission times should be counted.

7. A transmission device that can transmit a data unit to a reception device as it is or part by part after dividing the data unit into parts, and can retransmit the transmitted data unit to the reception device, the transmission device comprising:
   a storage portion that stores position information indicating a position of the data unit to be transmitted every time when the transmission device transmits the data unit to the reception device;
   a determining portion that determines whether or not transmission times should be counted along with a transmission of the data unit based on the position information of the data unit to be transmitted and position information of a data unit that was transmitted last time; and
   a counting portion that counts the transmission times when it is determined by the determining portion that the transmission times should be counted.

8. A computer program product comprising a non-transitory computer-readable medium storing computer program instructions, for use in a computer, for counting transmission times of a data unit with a transmission device that can transmit the data unit to a reception device as it is or part by part after dividing the data unit into parts, and can retransmit the transmitted data unit to the reception device, the computer program instructions, when executed, causing the computer to execute processes comprising:
   a process of making a storage portion store position information indicating a position of the data unit to be transmitted every time when the transmission device transmits the data unit to the reception device;
   a process of determining whether or not the transmission times should be counted along with a transmission of the data unit based on the position information of the data unit to be transmitted and position information of a data unit that was transmitted last time; and
   a process of counting the transmission times when it is determined by the process of determining that the transmission times should be counted.

* * * * *